United States Patent [19]

Richardson

[11] 3,923,489

[45] Dec. 2, 1975

[54] PELLETIZED FERTILIZER

[76] Inventor: Ralph W. Richardson, 195 Mount Lebanon Blvd., Pittsburg, Pa. 15228

[22] Filed: May 23, 1973

[21] Appl. No.: 363,126

[52] U.S. Cl. ............... 71/61; 71/63; 71/64 DA; 423/545
[51] Int. Cl.² .. C05D 9/00; C05C 3/00; C05F 11/00
[58] Field of Search ..... 71/61, 63, 64 DA; 423/545; 471/25

[56] References Cited
UNITED STATES PATENTS

| | | | |
|---|---|---|---|
| 2,710,795 | 6/1955 | Douglas | 71/64 DA |
| 2,893,858 | 7/1959 | MacDonald | 71/64 A |
| 3,464,809 | 9/1969 | Hicks | 71/63 X |
| 3,539,329 | 11/1970 | Wilson | 71/64 DA |
| 3,598,563 | 8/1971 | Burch | 71/25 |
| 3,657,423 | 4/1972 | Yacowitz | 426/210 |
| 3,725,029 | 4/1973 | Blackmore | 71/64 DA |
| 3,738,821 | 6/1973 | Barker | 71/61 |
| 3,776,188 | 12/1973 | Komakine | 71/21 X |

*Primary Examiner*—Frank A. Spear, Jr.
*Assistant Examiner*—Ferris H. Lander
*Attorney, Agent, or Firm*—J. Wesley Everett

[57] ABSTRACT

A method of producing and pelletizing fertilizer by compounding dry ammonium sulphate and fly ash and subsequently treating the dry compound of ammonium sulphate and fly ash with a saturated solution of ammonium sulphate and water to form a wet doughy mass which is formed into pellets and dried.

1 Claim, No Drawings

PELLETIZED FERTILIZER

The present invention relates in particular to a fertilizer compound from a blend of ammonium sulphate and fly ash.

Amonium sulphate's high percentage of nitrogen is well known (around 21%) and has been used as a fertilizer by diluting the ammonium sulphate with water. However, liquid fertilizers are not too popular for certain uses as they are difficult to store and handle. The most practical form of fertilizer apparently is in granulated or pelletized form, particularly the latter.

Ammonium sulphate in its dry state has also been used with dry fly ash, the fly ash being used to dilute the ammonium sulphate. The mixture of the dry ammonium sulphate and dry fly ash is much too fine to be practical for use as a cover fertilizer, and it is the present method of compounding the fertilizer and forming stable pellets that makes the present discovery a new and practical commodity.

The primary object of the invention is to put the ammonium sulphate in a diluted stable state where it may be stored until used as a practical fertilizing product.

Another object of the invention is to provide the ammonium sulphate in the form of pellets whereby it may be conveniently handled by readily available equipment.

While several objects of the invention have been pointed out, other objects, uses and advantages will become more apparent as the nature of the invention is more fully described.

Large amounts of ammonium sulphate are obtainable as a by-product from coke ovens in the manufacture of steel, and fly ash is a by-product of coal burning furnaces. By combining these two by-products a great deal of savings is obtained apart from the very important fact that the ecology of the air will be saved from these dust-like fly ash compounds which are normally dumped as fills, etc.

The nitrogen content of the final product is regulated by the amount of fly ash added to the ammonium sulphate while both are in their dry state. Water alone will not blend satisfactorily with this mixture of dry ammonium sulphate and dry ash mixture, and it is essential that the water or liquid used for making the mixture into a doughy mass be a mixture of water and ammonium sulphate to the point of saturation of the water with the ammonium sulphate. The amount of ammonium sulphate in the water when at its saturation point is substantially always constant. Therefore, the dilution of the ammonium sulphate is easily determined by the proportions of fly ash which is mixed therewith before the saturated ammonium sulphate is added to the dry mixture.

The nitrogen content of the final product is regulated by the amount of fly ash which is added to the ammonium sulphate while both are in their dry state.

The dry mixture of ammonium sulphate and fly ash in the proportions of one part ammonium sulphate and three parts fly ash will generally give a very satisfactory fertilizer for growing plants.

What I claim and desire to secure by Letters Patent is as follows:

1. A method for making a pelletized nitrogen fertilizer where the nitrogen content of the final fertilizer product is regulated comprising:
   a. thoroughly mixing dry ammonium sulphate with fly ash in the proportions of at least one part ammonium sulphate to three parts fly ash by weight whereby the nitrogen content is regulated by the amount of fly ash added to the ammonium sulphate while both are being dry mixed;
   b. making a saturated solution of ammonium sulphate and water;
   c. blending the mixture of dry ammonium sulphate and fly ash with the saturated solution of ammonium sulphate and water to form a wet doughy mass;
   d. forming the said wet doughy mass into small individual particles by pelletizing the same; and
   e. drying the individual particles to form a granulated fertilizer.

* * * * *